May 26, 1964

C. O. GLASGOW 3,134,395

MANIFOLD VALVE

Filed Feb. 18, 1960

INVENTOR.
Clarence O. Glasgow
BY
Arthur L Wade
ATTORNEY

INVENTOR.
Clarence O. Glasgow
BY Arthur L. Wade
ATTORNEY

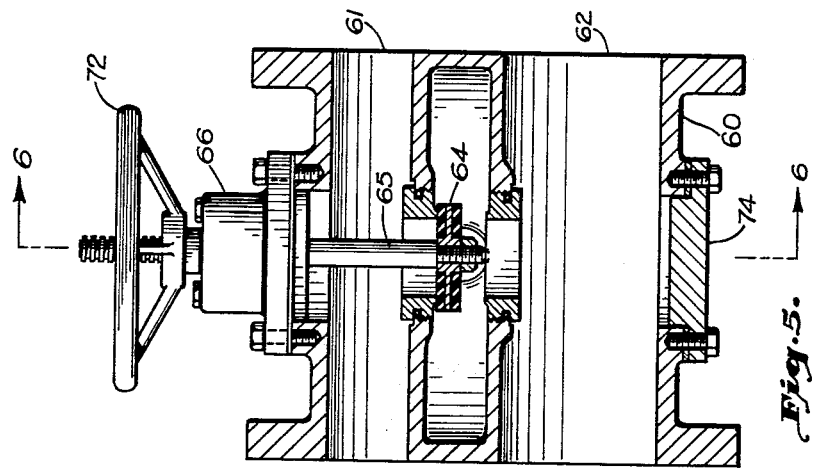
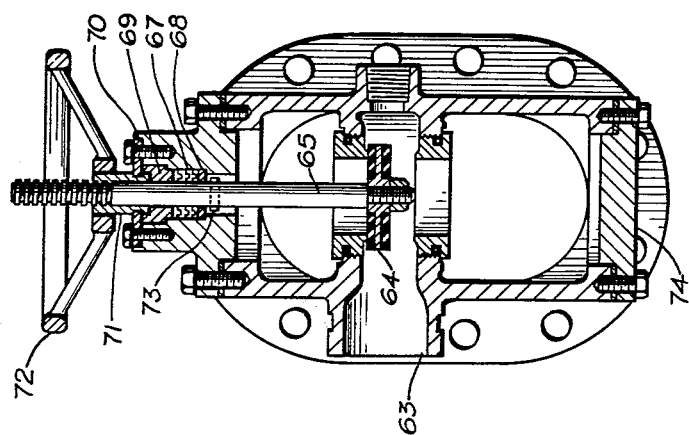

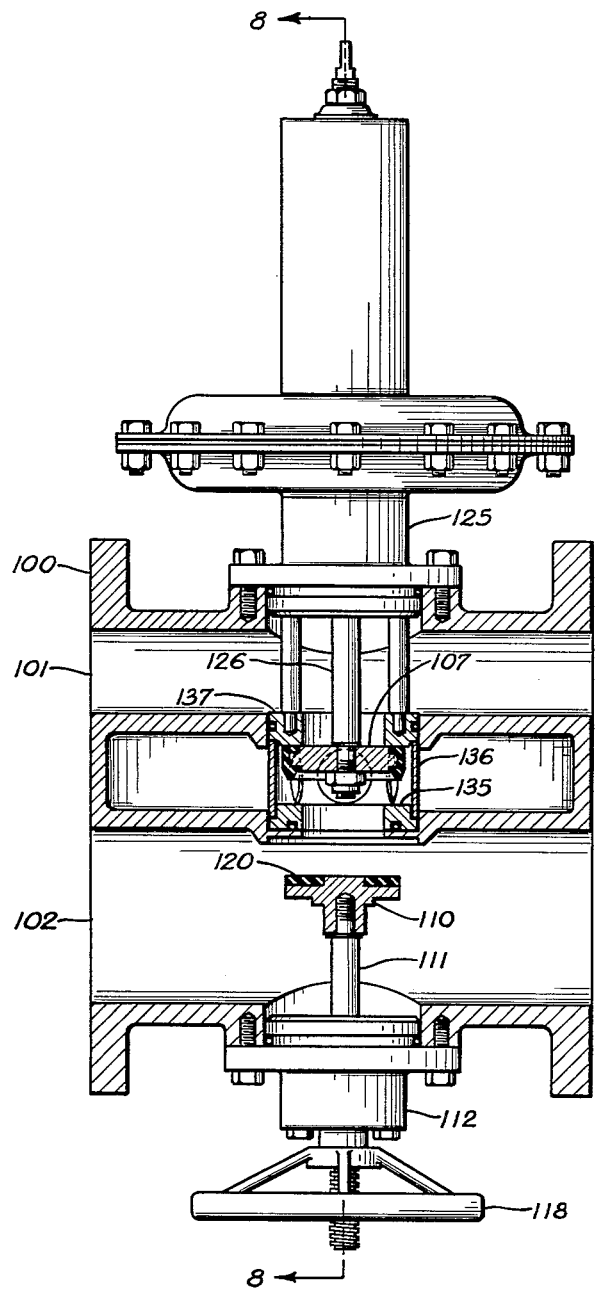

INVENTOR.
CLARENCE O. GLASGOW

INVENTOR.
CLARENCE O. GLASGOW
BY Arthur R Wade
ATTORNEY

United States Patent Office 3,134,395
Patented May 26, 1964

3,134,395
MANIFOLD VALVE
Clarence O. Glasgow, Tulsa, Okla., assignor to National
Tank Company, Tulsa, Okla., a corporation of Nevada
Filed Feb. 18, 1960, Ser. No. 9,464
8 Claims. (Cl. 137—315)

The present invention relates to a valve. More particularly, the invention relates to a diverting valve which can be directly combined with duplicate units to form dual manifolds with which the individual inputs to each valve can be alternately communicated.

A plurality of oil wells may have their outputs continuously produced to a central location for selective testing of the individual wells and for storage or treating. This testing may be either quantitative and/or qualitative. It is generally desirable to determine the production of the individual wells in order to monitor the operativeness of the producing equipment and/or capacity of the well. Also, it may be desirable to qualitatively test the individual wells to determine if the composition of the production needs to be altered by processing.

The valves and manifold piping required to combine the plurality of flows, and to selectively test the individual well flows, has been complicated and expensive. Simplification of the systems for handling the individual testing is sought.

Also, servicing of valves performing functions as complex and numerous as required for testing is difficult. An arrangement is required to isolate the valve element and trim, such arrangement being a part of the valve housing. The present invention provides this simplification.

The primary object of the present invention is to provide a valve housing which will form a plurality of manifold passages when made up with a series of similar housings.

Another object is to provide a valve housing which will form a pair of manifolds when joined with similar housings to which the valve element in the housing will divert fluid flow from a single inlet into the housing.

Another object is to provide a valve housing which will form a pair of manifolds when joined with similar housings which manifolds may be valved alternately to a single inlet and one of which manifold may be isolated from both the inlet and other manifold by valving.

The present invention contemplates a unitary valve housing, shaped to join with similar housings to form a pair of manifold conduits. The valve element of each unitary valve housing selectively isolates and connects the fluid flow to the valve with respect to each of the manifold conduits formed by the housings.

The invention further contemplates that the valve housings form a series of parallel manifold conduits with the valve element of each valve housing seating in the inlets through the walls of the conduits to selectively direct fluid flow from each valve housing inlet to the conduits.

The invention further contemplates a valve whose housing, with opposed flanges, has a partition extending between the flanges to form a pair of parallel manifold passages. The units are adapted to be flanged together to form a pair of parallel manifold passages. The partition is hollow and receives a fluid which is diverted to alternate manifold passages through holes in the partition walls by a valve element in the hollow chamber of the partition alternately seating in the partition holes.

The present invention further contemplates a second valve element within the housing arranged to seat on one of the partition holes. With one manifold isolated from both the inlet and other manifold, it is then possible to remove the first valve element, and its seats in the partition holes, for repair and replacement.

Other objects, advantages and features of this invention will become apparent to one skilled in the art upon consideration of the written specification, appended claims, and attached drawings wherein;

FIG. 5 is a partially sectioned elevation of a single manifold valve similar to that of FIG. 3 but having a hand-operated valve elements;

FIG. 6 is a section along lines 6—6 of FIG. 5;

FIG. 7 is a sectioned elevation of a single manifold valve with a second valve element arranged to isolate the inlet and upper parallel passage from the lower parallel passage in accordance with the invention;

This application is a continuation-in-part of United States application Serial No. 755,219, filed August 15, 1958, by Clarence O. Glasgow.

Figure 1:
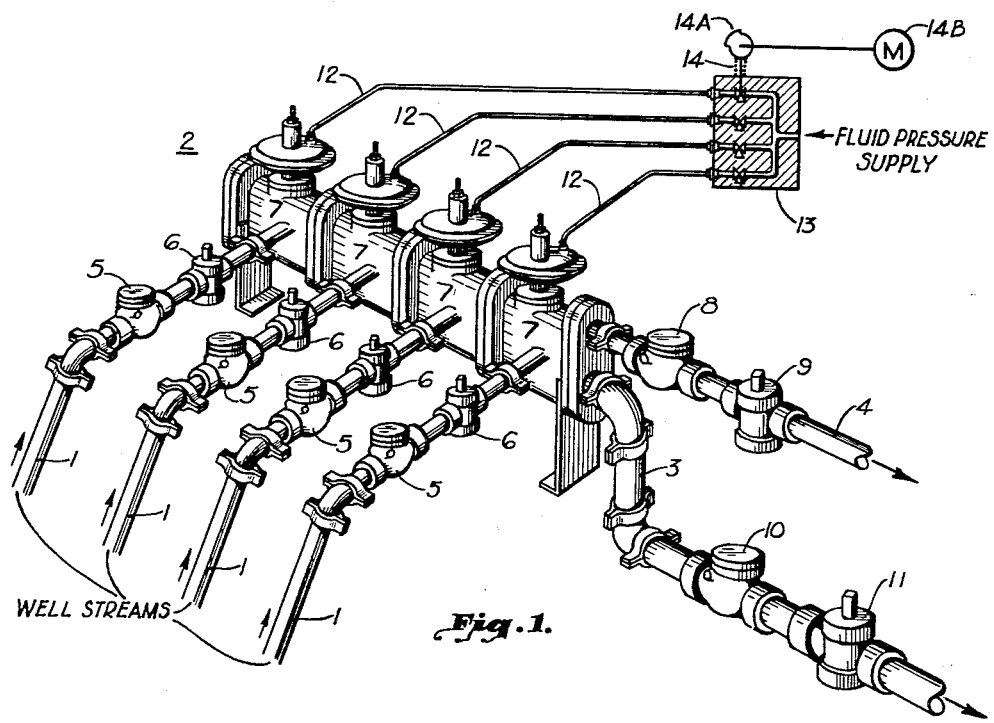
FIG. 1 is a perspective illustration of manifold conduits receiving oil well production for passing to a treater, storage tanks, or to test apparatus, embodying the present invention.

Referring specifically to FIG. 1, there is shown a manifold system receiving the individual production of a plurality of oil wells. The production of the plurality of oil wells is combined and transported to a treater or storage tanks. Additionally, there is provided an arrangement to selectively isolate the production of a single one of the wells in order that it may be quantitatively, or qualitatively, tested.

Conduits 1 are brought to this central location for transport of individual oil well production. The plurality of conduits 1 are brought to a manifold housing 2 for combination and transferred to a treater, or storage tank, by way of conduit 3. Alternately, any one of the productions of conduits 1 may be divided from the combination of productions by a valve element in manifold housing 2 and passed to conduit 4. Conduit 4 may take the output of a single well to a measuring tank to determine the quantitative production of that well, or to apparatus for determining the quality of the production.

Each of conduits 1 is shown including a check valve 5 as means to insure that the oil well production flows only from the well to manifold 2. Additionally, a plug valve 6 is placed in each conduit 1 to provide manual shutdown of the individual well production through its conduit 1.

Each of conduits 1 connects into manifold housing 2 through an individual valve whose housing is a part of the manifold housing 2 and whose valve element is a means for diverting the individual well production coming to its housing from the combination of all the productions. These individual valve housings are designated 7. On each valve body 7 is mounted a housing for an operator with which the valve element within body housing 7 is shifted from a position which will cause the individual well production to combine with the other productions or divert to test.

Conduit 4, to which each of the individual well productions of conduits 1 may be diverted, contains a check valve 8 which insures flow only in the direction from manifold housing 2. Additionally, a plug valve 9 is also provided for manually isolating the manifold housing 2 from the test equipment.

Conduit 3, for the combined well production, also contains a check valve 10 and a plug valve 11. Thus, flow of combined production from manifold housing 2 to process equipment, or storage, is insured, as well as manual isolation between the process equipment or storage, and the manifold housing 2.

It is preferred that conduits 3 and 4 be coupled to manifold housing 2 from the same end. Then when it is desired to add a valve housing 7 to the manifold housing, no change in existing piping or fixtures is required. The blind flange on the end of manifold housing 2 is simply removed and the new valve housing 7 placed on the end. The blind flange is placed on the end of housing 2 and the new production is brought in without delay or relocation of a tangle of valves and pipes.

Although each valve element within valve housing 7 may be actuated between its two positions manually, FIG. 1 illustrates a diaphragm operator which receives a fluid pressure to provide the power for the desired shift of the valve element between the two positions. FIG. 1 illustrates each of the diaphragm operators of the valve-body 7 responding to a fluid pressure through a pipe 12. Pipes 12 are illustrated as connected selectively to a common source of fluid pressure by a control mechanism within 13. Control station 13 is illustrated diagrammatically, however, its manual or automatic operation is not difficult to understand. The common fluid pressure source is shown as feeding a manifold which is selectively communicated with pipes 12. A spring-closing valve 14 is shown between the supply manifold and one pipe 12. A cam 14A is shown as rotated by a motor 14B to open valve 14 against its spring force for a predetermined period of its rotation. The motor 14B can turn a set of cams 14A with a common shaft, each of the cams cut to actuate valves 14 at different times. Whether the fluid pressure supply is coupled to the pipes 12 manually, or automatically, the fluid pressure is placed upon the diaphragm operators of the valve bodies 7 to divert the individual well production to that valve from the combined stream to test equipment connected to conduit 4.

Figure 2:
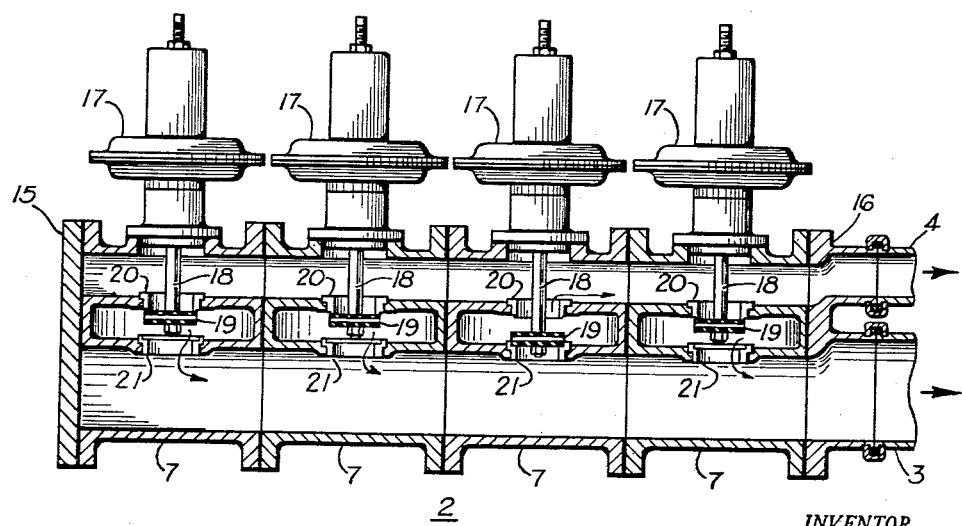
FIG. 2 is a sectioned elevation of the manifold of FIG. 1 embodying the present invention.

FIG. 2 is a sectioned elevation of the manifold 2 of FIG. 1. Individual valve bodies 7 are shown with parallel passages aligned to form the two manifold conduits. The blind flange 15 is shown positioned on the left hand end of the manifold housing 2 while conduits 3 and 4 are coupled to an adapter flange 16 on the right hand end of the manifold housing 2 in order to communicate the two manifold passages in the housing with conduits 3 and 4.

The diaphragm operators mounted on each of valve bodies 7 are contained in housings 17. The diaphragms within housings 17 are connected to valve stems 18 so that valve plugs 19 can be alternately seated on seat rings 20 and 21. In alternately seating on rings 20 and 21, each valve plug 19 diverts the flow from the inlet connection to its valve body 7 through either seat ring 20 or seat ring 21. The inlet connections to the valve bodies are not shown in FIG. 2, however, one of the valve plugs 19 is shown in the position alternate to that of the other valve plugs 19 to illustrate the alternate diversion.

Figure 3:
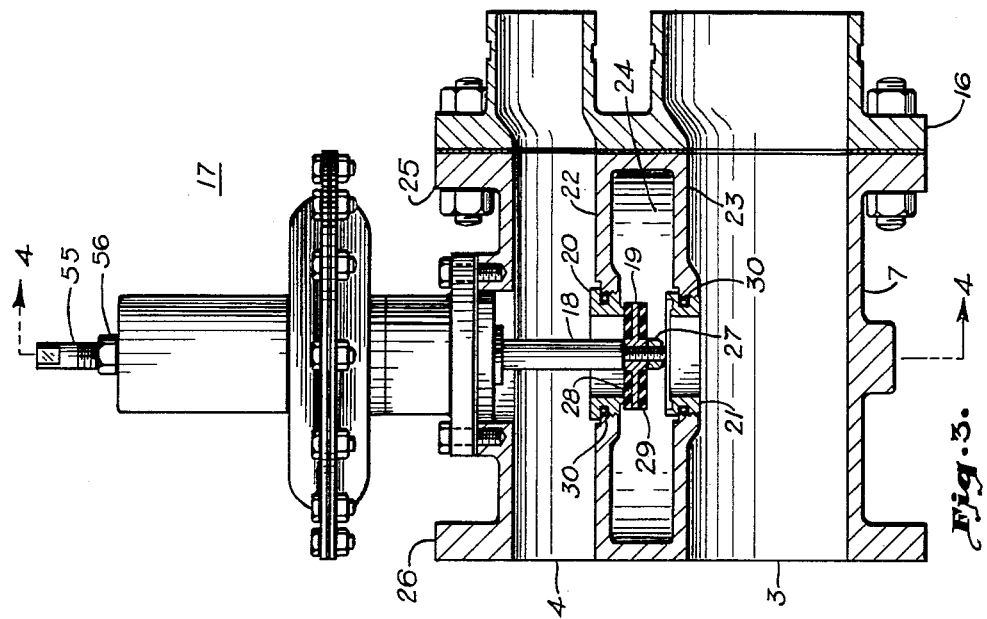
FIG. 3 is a partially sectioned elevation of a single valve of the manifold of FIG. 2.
Figure 4:
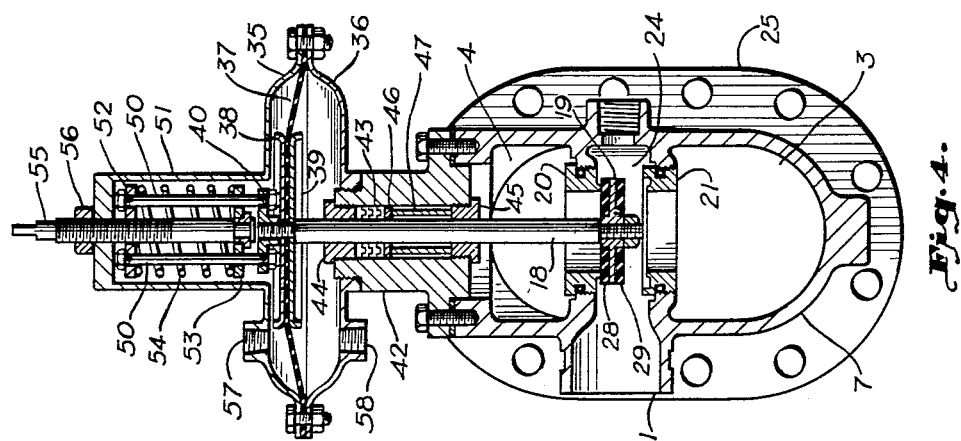
FIG. 4 is a section along lines 4—4 of FIG. 3.

FIGS. 3 and 4 illustrate the details of construction within the individual valve bodies 7. The two parallel passages of the valve body 7 illustrated in these figures, are indicated as 3 and 4 because of their direct communication with conduits 3 and 4 through adapter flange 16.

The housing 17 of the diaphragm operator is illustrated as bolted to the top of valve body 7. Valve stem 18 extends from the diaphragm operator through the upper seat ring 20 in order to carry valve plug 19 between its alternate seatings on the upper and lower seat rings 20, 21.

Seat rings 20 and 21 are mounted in aligned holes which extend through walls of a hollow partition between the two parallel passages 3 and 4. Wall 22 and wall 23 are spaced apart to form the hollow partition. The hollow partition actually forms a chamber 24 into which inlet 1 brings the well production. Depending on the seating of valve plug 19, this well production through inlet 1 is diverted to either conduit 3 or conduit 4.

Although valve bodies 7 need not be flanged, the embodiment illustrated shows flanges 25 and 26 which may be bolted to the flanges of similar valve bodies 7, adapter flange 16 or blind flange 15. Other clamping means are readily conceivable whereby these units can be sealed together to form manifold housing 2 in communication with conduits 3 and 4 and the well production through conduit 1.

Valve plug 19 essentially comprises a metallic body mounted on the end of valve stem 18. Flex nut 27 illustrates a convenient means for holding this metallic plug body 19 against a shoulder on valve stem 18. Neoprene insert seats 28 and 29 are formed and bonded to the metallic body of valve plug 19. These insert seats are specifically brought to bear against the openings of the upper and lower seat rings 20, 21 to alternately isolate the fluid of conduit 1 from conduits 3 and 4. Each of seat rings 20 and 21 are mounted in the aligned holes of their respective walls by threads. The rings 20, 21 are sealed to the walls by O-rings 30.

FIG. 4 shows, in further section, the packing about valve stem 18 and the diaphragm operator in housing 17. Diaphragm housing 17 is more specifically comprised of upper diaphragm case 35 and lower diaphragm case 36. These cases 35 and 36 are bolted together with diaphragm 37 clamped between them. The center of diaphragm 37 is clamped between diaphragm plate 38 and diaphragm plate 39. Both plates 38 and 39 and diaphragm 37 are clamped against a shoulder of valve stem 18 by a cap piece 40 threaded on the upper end of valve stem 18.

The lower diaphragm case 36 is attached to a body cover 42 through which the valve stem 18 extends, in its packing. Packing material is illustrated at 43 and is held against valve stem 18 by upper packing nut 44, lower packing nut 45, packing washer 46 and spacer 47. All of this structure is combined with packing 43 to seal about valve stem 18 and prevent the escape of fluid into the diaphragm housing from conduit 4.

Studs 50 are attached to cap piece 40 by their lower ends. These studs extend up into a cylindrical sleeve 51 mounted on upper diaphragm case 35. The top of studs 50 are attached to an upper spring rest 52. Between upper spring rest 52 and lower spring rest 53 is arranged spring 54. Holes in lower spring rest 53 permit studs 50 to slide therethrough. Spring 54 is coiled on the outside of the studs 50 while captured between its two spring rests.

Adjusting screw 55 is rotatably attached to the center of lower spring rest 53 and extends up through the top of the cylindrical sleeve 51. As adjusting screw 55 is threadedly engaged through the top of the sleeve 51, it can be raised and lowered by rotation. Attached as screw 55 is to the lower spring rest 53, its raising and lowering varies the compression of spring 54 and, correspondingly, the upward force exerted on stem 18, jam nut 56 fixes the position of screw 55 in its adjustment of spring 54 compression.

In FIGS. 3 and 4, valve stem 18 and valve plug 19 are shown in their uppermost position. The stem and plug are carried to, and held in, their up position by the force of spring 54. A downward force is developed by placing fluid pressure in upper diaphragm case 35 and on diaphragm 37. Inlet connection 57 is provided in upper diaphragm case 35 for communication with a source of fluid pressure which will develop a force large enough to overcome the force of spring 54 and carry stem 18 and plug 19 to their lower position. The result of this arrangement is that failure of the fluid pressure source will result in the diversion of the well production through inlet 1 to the storage tank or processing equipment of conduit 3. The alternate diversion is possible, of course, with spring 54 acting directly down on stem 18 and fluid pressure applied to diaphragm 37 through inlet 58.

FIGS. 5 and 6 show a valve body 60 similar to valve body 7 of the preceding figures. Parallel passages 61 and 62 receive well production alternately from inlet 63, as diverted by valve plug 64. In the foregoing disclosure, the valve plug of body 7 has been actuated by a diaphragm operator. In FIGS. 5 and 6, a mechanism is disclosed which is manually manipulated to shift valve plug 64 between its alternate seats.

Valve stem 65 is reciprocated vertically, after the fashion of stem 18, to alternately seat plug 64 on its two seats. Stem 65 extends up through a body cover 66 and is packed at 67. The packing 67 is compressed about stem 65 in body cover 66 between a washer 68 and a follower 69. A split ring 70 is fixed to the top of the body cover 66 by screws and bears against the packing material captured with washer 68 held against an internal shoulder in the base of the body cover.

Split ring 70 also fits into a recess of a wrench square member 71. Wrench square 71 is internally threaded to engage threads on the upper end of valve stem 65. Externally, wrench square 71 is held by slot engagement with split ring 70 against vertical movement relative to the body cover and valve body. Also, externally, wrench square 71 is shaped to engage, as a male member, the female center hole of hand wheel 72.

Turning wheel 72, will raise and lower stem 65. The upper end of stem 65 is visible and an operator can turn wheel 72 with this visual guide as to the vertical position of the valve plug 64 on the other end of stem 65. Normally, if the stem is up, through wheel 72, the inlet 63 is having its well production diverted into conduit 62. Guide pin 73 on stem 65 travels in vertical slots of body cover 66 to prevent rotation of stem 65 as wheel 72 is rotated.

The valve body 60 has an additional feature not discussed in connection with the foregoing figures. A hole in the bottom of the body is aligned with the partition holes and the top hole, covered by body cover 66. This bottom hole is disclosed as sealed by a bottom plug 74 bolted to the body 60. If desired, plug 74 can be removed and a body cover substituted, similar to the body cover 66. A valve element can be positioned by a stem packed in the bottom cover. This valve element could be used to seat on the bottom ring and plug 64 could be seated on the upper ring. This arrangement thereby permits a well production to be shut in by this very inexpensive addition to the valve body 60.

Figure 8:
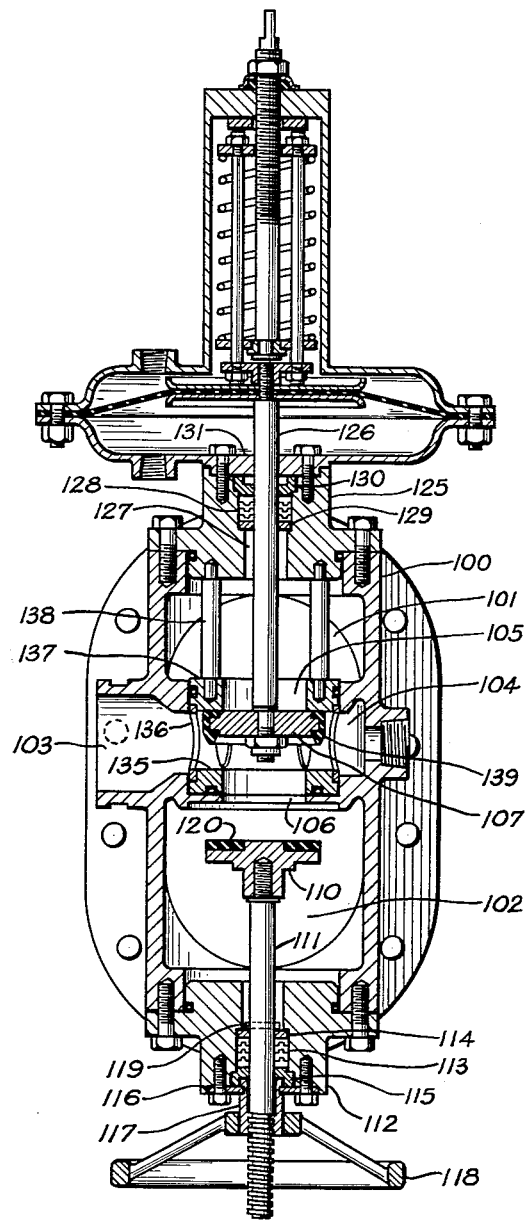
FIG. 8 is a section along lines 8—8 of FIG. 7.
Figure 9:
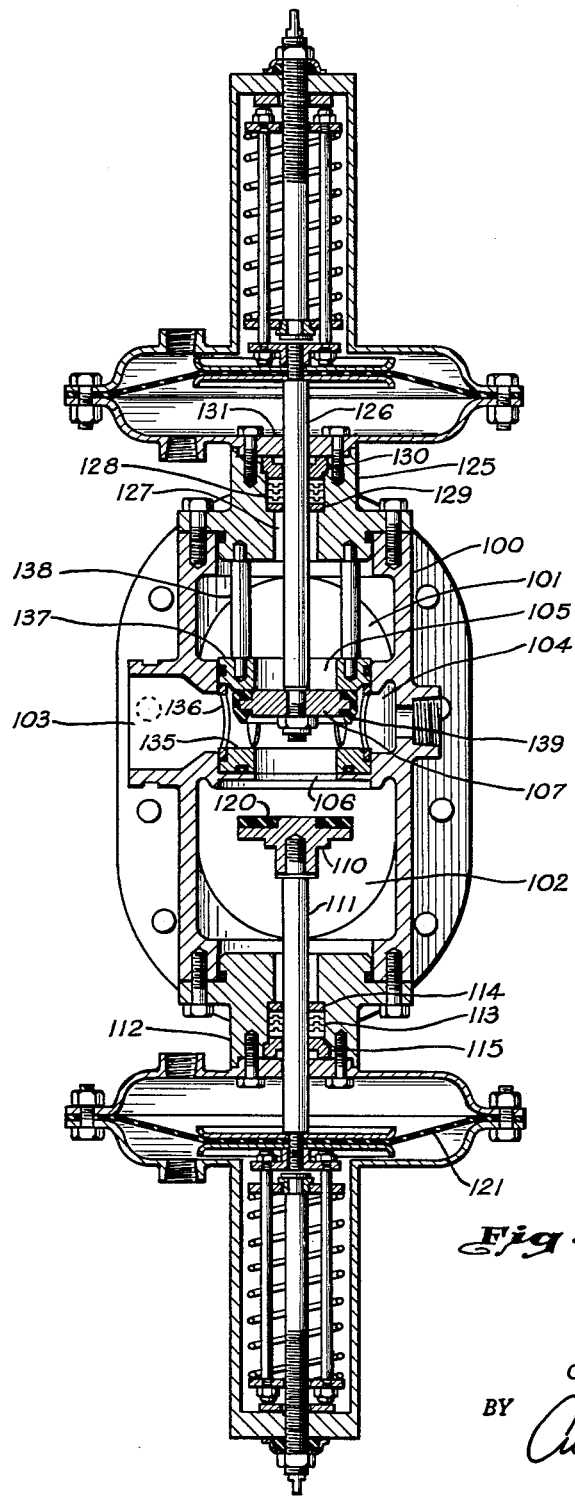
FIG. 9 is a sectioned elevation of a single manifold valve with a second valve element arranged to be actuated by a control fluid pressure to isolate the inlet and upper parallel passage from the lower parallel passage in accordance with the invention.

FIGS. 7–9 have been established to clearly illustrate the second valve element positioned within the housing to isolate the inlet and upper parallel passage from the lower parallel passage. The plug-plate 74 of FIGS. 5 and 6 is removed from the structure as illustrated in FIGS. 7–9 and a bonnet similar to the body cover 42 bolted into place in order for the second valve element to be seated on the lower of the aligned holes of the chamber of the hollow partition.

More specifically, valve body 100 has upper passage 101 and lower passage 102 parallel to 101, in a scheme similar to the valves of the preceding figures. An inlet 103 is communicated with chamber 104 for fluid to be diverted through ports 105 and 106. Ports 105 and 106 are in vertical alignment in the walls of chamber 103, and valve element 107 alternately closes ports 105 and 106 in diverting inlet 103 fluid.

In cooperation with first valve element 107, the second valve 110 is positioned on lower port 106 to isolate parallel passage 102 from inlet 103 and parallel passage 101. It is important that the result of this second valve action be understood. There is a distinct advantage to providing this second valve and no other valve structure intended to function as does this type of valve has such advantage.

The isolation valving provided by the second valve element 110 enables servicing personnel to remove the top bonnet and inspect, repair or replace the first valve element and its trim. Thus, in this type of manifold, the individual valves which make up the manifold can be quickly repaired and placed in good working order without removing the entire body 100 or shutting down all fluid flow in the manifold.

Valve plug 110, and its actuating mechanism, is practically a duplicate of plug 64, and its actuating mechanism. Valve stem 111, valve bonnet 112, packing 113, washer 114, follower 115, split ring 116, wrench square 117, wheel 118, and even guide pin 119 are essentially identical to 65–73 of FIGS. 5 and 6. Valve plug 110 is, itself, somewhat more simply formed than plug 64, having only a simple deformable seat 120 to bring against the flat surface machined around the underside of port 106.

When valve body 100 is normally incorporated into a manifold system as illustrated in FIGS. 1 and 2, lower passage 102 has the well production from inlet 103 diverted into it. When it is desired to test the well production coming into inlet 103, valve plug 107 is lowered until it engages its lower seat 135. The production of inlet 103 then flows up into passage 101. When a plug valve 6 (FIG. 1) is closed and valve plug 110 seated on the underside of the partition and about port 106, the top bonnet 125 can be removed for the inspection, repair, and replacement mentioned above without interruption of the function of passage 102 in the manifold as a part of the production conduit serving a number of wells.

FIG. 9 illustrates how stem 111 may be actuated by a diaphragm instead of handwheel 118. Through diaphragm 121, fluid pressures generated automatically can be utilized to seat isolating valve plug 110. Fluid pressures can be generated by a time-cycle mechanism similar to controller 13 of FIG. 1, arbitrarily by an operator, or in response to any desired variable of the system which can be sensed and converted.

In FIGS. 7–9, bonnet 125 serves the same basic purpose as body cover 42 of FIG. 4. The top works of bonnet 125 has been sectioned after the manner of FIG. 4. So disclosed, the top works for actuating stem 126 in FIGS. 7–9 is seen to be the same as the top works of FIG. 4. However, the arrangement for packing stem 126 in bonnet 125 is somewhat different than the arrangement for packing stem 18 in bonnet 42. Also, the first valve element 107 and its trim are quite different from valve plug 19 and its trim. In general, the bonnet 125 and trim are arranged to be readily removed from body 100 when the second valve element is seated on the lower port 106 of chamber 104.

More specifically, the bore 127 of bonnet 125 is provided with a series of two counterbores from its upper end. The lower counterbore has packing material 128 in it, arranged about stem 126. A washer 129 backs up this packing from below. A packing washer 130 is placed above the packing 128 in a second counterbore and a plate 131 is bolted to the top of bonnet 125 to bear against washer 130 in metal-to-metal contact to compress packing 128 about stem 126.

The lower part of bonnet 125 holds the trim of the first valve element in place within the ports 105 and 106. The trim is specifically comprised of lower seat 135, ported sleeve 136 and upper seat 137. Lower seat 135 is held against a machined surface on the upper surface of port 106 and sealed to this surface by an O-ring. Sleeve 136 holds the lower seat 135 in place and carries upper seat 137 on top of itself, in port 105. Further, upper seat 137 is sealed to the vertical surface of port 105 with an O-ring.

Seat 135, sleeve 136 and seat 137 are all held in their respective positions within ports 105 and 106 from bonnet 125. Pins 138 are doweled into the opposing surfaces of bonnet 125 and seat 137. When bonnet 125 is bolted onto valve body 100, all the parts of the trim are held securely against the surface machined about port 105 and in position to cooperate with the first valve element 107 as it is positioned by stem 126.

The upper surface of lower seat 135 and the lower surface of upper seat 137 are engaged by the first valve element 107 to control the diversion of fluid in chamber 104 through ports 105 and 106. In FIG. 4 sealing surfaces for valve plug 19 were provided by inserts 28 and 29. However, there was no metal-to-metal contact between plug 19 and its seat rings 20 and 21. There is a possibility of extruding the deformable material of inserts 28 and 29 in such arrangement. This possibility is avoided in the arrangement of FIGS. 7–9.

Valve element 107 is fixed to the end of stem 126 and formed with a pair of upper and lower recesses on its upper and lower surfaces at its edge. A single piece of deformable material 139, with a U-shaped cross-section, is fitted over the edge remaining on the circular body of valve element 107. The body of the deformable element is extended a finite distance above the surfaces of the element 107. The peripherial inserts are extended into the center of the valve disc 107 only far enough to carry the deformable material 139 securely. However, a solid rim of upper and lower surface of valve disc 107 remains to engage seats 135 and 137 in metal-to-metal contact after the seal element 139 has been deformed against the surfaces of disc 107. In this arrangement, adequate sealing is obtained between lower seat 135 and upper seat 137 and the first valve element without excessive forces on stem 126 extruding the deformable material 139.

All of the trim, and bonnet 125, are removable from valve body 100 by simply unbolting bonnet 125. When it is desired to inspect, service, or replace any of these removable parts, it is only necessary to seat the second valve element 110 on the underside of port 106 after a plug valve on the inlet to chamber 104 has been closed. If other valve bodies are connected to body 100 to form two manifolds, the neighboring bodies must have their first valve elements positioned to divert the fluid of their inlets to the lower passage-manifold. The result is no back pressure in the upper passage-manifold and isolation of the lower passage-manifold from the parts to be removed for inspection, service, or replacement. Obviously, this arrangement greatly facilitates field servicing by a minimum of personnel.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve including,
   a housing having opposed flanges,
   a partition in the housing arranged to extend between the opposed flanges to form two parallel passages between the flanges and opening at opposite ends of the housing, the partition having a chamber,
   an inlet connection into the chamber from a point external the housing,
   removable valve seats in opposed ports of the chamber in the partition each of which ports provide communication between the chamber and one of the parallel passages,
   a first valve element arranged to engage the removable seats alternately,
   a first bonnet mounted on the housing,
   a valve operator mounted on the bonnet and extending into the housing to reciprocate the first valve element between the removable seats for the alternate engagement,
   means extending from the bonnet to hold the removable seats in the opposed ports of the partition chamber,
   a second bonnet mounted on the housing,
   a second valve element arranged to engage the partition about one of the ports on the side opposite the removable valve seats and first bonnet,
   and an operator mounted on the second bonnet and extending from external the housing to position the second valve element on the partition and about one of the ports and thereby isolate the inlet and one passage from the other parallel passage.

2. A valve including,
   a housing having opposed flanges,
   a partition in the housing arranged to extend between the opposed flanges to form two parallel passages between the flanges and opening at opposite ends of the housing, the partition having a chamber,
   an inlet connection into the chamber from a point external the housing,
   removable valve seats in opposed ports of the chamber in the partition each of which ports provide communication between the chamber and one of the parallel passages,
   a first valve element arranged to engage the removable seats alternately,
   a first bonnet mounted on the housing,
   a valve operator mounted on the bonnet and extending into the housing to reciprocate the first valve element between the removable seats for the alternate engagement,
   means extending from the bonnet to hold the removable seats in the opposed ports of the partition chamber,
   a second bonnet mounted on the housing,
   a second valve element arranged to engage the partition about one of the ports on the side opposite the removable valve seats and first bonnet,
   an operator mounted on the second bonnet and extending from external the housing to position the second valve element on the partition and about one of the ports and thereby isolate the inlet and one passage from the other parallel passage,
   and means for actuating the operator on the second bonnet by a fluid pressure which is generated when it is desirable to gain access to the first valve element and its valve seats in the body housing for repair and replacement.

3. A valve including,
   a housing having opposed flanges,
   a partition in the housing arranged to extend between the opposed flanges to form two parallel passages between the flanges and opening at opposite ends of the housing,
   a chamber in the partition,
   an inlet connection into the chamber from a point external the housing,
   a first bonnet mounted on the housing,
   a valve operator mounted on the first bonnet and extending from external of the housing through an access opening through the housing wall and through one of two opposed ports of the chamber in the partition, each of which ports provide communication between the chamber and one of the parallel passages,
   valve seats in the opposed ports of the chamber in the partition sized and arranged to be removable through one of the ports and the access opening through the housing wall for the valve operator mounted on the first bonnet,
   a first valve element mounted on the valve operator mounted on the first bonnet and reciprocated within the partition chamber to alternately engage the valve seats, the first valve element being removable through the access opening,
   a second bonnet mounted on the housing,
   a second valve element arranged to engage the partition about one of the chamber ports on the side of the port which is away from the associated seat and thereby isolate the inlet connection and one parallel passage from the other parallel passage while the first valve element and both removable seats are taken through the access opening through the housing wall for repair and replacement, and a valve operator mounted on the second bonnet and extending from external the housing to position the second valve element.

4. A valve including, a housing having opposed flanges, a partition in the housing arranged to extend between the opposed flanges to form two parallel passages between the flanges and opening at opposite ends of the housing, a chamber in the partition, an inlet connection into the chamber from a point external the housing, a first bonnet mounted on the housing, a valve operator mounted on the first bonnet and extending from external of the housing through an access opening through the housing wall and through one of two opposed ports of the chamber in the partition, each of which ports provide communication between the chamber and one of the parallel passages, valve seats in the opposed ports of the chamber in the partition sized and arranged to be removable through one of the ports and the access opening through the housing wall for the valve operator mounted on the first bonnet, a first valve element mounted on the valve operator mounted on the first bonnet and reciprocated within the partition chamber to alternately engage the valve seats, the first valve element being removable through the access opening, a second bonnet mounted on the housing, a second valve element arranged to engage the partition about one of the chamber ports on the side of the port which is away from the associated seat and thereby isolate the inlet connection and one parallel passage from the other parallel passage while the first valve element and both removable seats are taken through the access opening through the housing wall for repair and replacement, and a fluid pressure responsive operator mounted on the second bonnet and extending from external the housing to position the second valve element when actuated by a fluid pressure which is generated when it is desirable to gain access to the first valve element and its valve seats with the inlet connection and one parallel passage isolated from the other parallel passage.

5. A conduit system for manifolding the production of a series of wells including;

an inlet conduit from each well for conveying production;

a first outlet conduit into which the production of the inlet conduits is placed for conveyance to a common point;

a second outlet conduit to which the inlet conduits are selectively connected for conveying the production of the inlets selected to test apparatus;

and a series of valves connected to the conduits and each one of the valves including, (a) a body housing having, a pair of flanges parallel to each other and facing in opposite directions, whereby the body housing may be joined to the body housings of the other valves of the series by coupling to their flanges, a partition in the housing arranged to extend between the opposed flanges to form two parallel passages between the flanges and opening at opposite ends of the housing, a first of the parallel passages being connected to the first outlet conduit and the second of the parallel passages connected to the second outlet conduit, and a closed chamber in the partition, (b) an inlet connection into the chamber from a point external the housing and communicating with one of the inlet conduits from a well through which the production is introduced into the closed chamber formed within the hollow partition, (c) a first bonnet mounted on the housing, (d) a valve operator mounted on the first bonnet and extending from external of the housing through an access opening through the housing wall and through one of two opposed ports of the chamber in the partition, each of which ports provides communication between the chamber and one of the parallel passages, (e) valve seats in the opposed ports of the chamber in the partition, the seats sized and arranged to be removable through one of the ports and the access opening through the housing wall for the valve operator mounted on the first bonnet, (f) a first valve element mounted on the valve operator mounted on the first bonnet and reciprocated within the partition chamber to alternately engage the valve seats, the first valve element being removable through the access opening, (g) a second bonnet mounted on the housing, (h) a second valve element arranged to engage the partition about one of the chamber ports on the side of the port which is away from the associated seat and thereby isolate the inlet connection and inlet conduit from a well and one of the parallel passages and the outlet conduit connected to the one parallel passage from the other parallel passage while the first valve element and both removable seats are taken through the access opening through the housing wall for repair and replacement, (i) and a valve operator mounted on the second bonnet and extending from external the housing to position the second valve element.

6. A conduit system for manifolding the production of a series of wells including;

an inlet conduit from each well for conveying production;

a first outlet conduit into which the production of the inlet conduits is placed for conveyance to a common point;

a second outlet conduit to which the inlet conduits are selectively connected for conveying the production of the inlets selected to test apparatus;

and a series of valves connected to the conduits and each one of the valves including, (a) a body housing having, a pair of flanges parallel to each other and facing in opposite directions, whereby the body housing may be joined to the body housings of the other valves of the series by coupling to their flanges, a partition in the housing arranged to extend between the opposed flanges to form two parallel passages between the flanges and opening at opposite ends of the housing, a first of the parallel passages being connected to the first outlet conduit and the second of the parallel passages connected to the second outlet conduit, and a closed chamber in the partition, (b) an inlet connection into the chamber from a point external the housing and communicating with one of the inlet conduits from a well through which the production is introduced into the closed chamber formed within the hollow partition, (c) a first bonnet mounted on the housing, (d) a valve operator mounted on the first bonnet and extending from external of the housing through an access opening through the housing wall and through one of two opposed ports of the chamber in the partition, each of which ports provides communication between the chamber and one of the parallel passages,
(e) valve seats in the opposed ports of the chamber in the partition, the seats sized and arranged to be removable through one of the ports and the access opening through the housing wall for the valve operator mounted on the first bonnet,
(f) a first valve element mounted on the valve operator mounted on the first bonnet and reciprocated within the partition chamber to alternately engage the valve seats, the first valve element being removable through the access opening,
(g) a second bonnet mounted on the housing,
(h) a second valve element arranged to engage the partition about one of the chamber ports on the side of the port which is away from the associated seat and thereby isolate the inlet connection and inlet conduit from a well and one of the parallel passages and the outlet conduit connected to the one parallel passage from the other parallel passage while the first valve element and both removable seats are taken through the access opening through the housing wall for repair and replacement,
(i) a valve operator mounted on the second bonnet and extending from external the housing to position the second valve element,
(j) and means for actuating the operator on the second bonnet by a fluid pressure which is generated when it is desirable to gain access to the first valve element and its valve seats in the body housing for repair and replacement.

7. A conduit system for manifolding the production of a series of wells including;
an inlet conduit from each well for conveying production;
a first outlet conduit into which the production of the inlet conduits is placed for conveyance to a common point;
a second outlet conduit to which the inlet conduits are selectively connected for conveying the production of the inlets selected to test apparatus;
and a series of valves connected to the conduits and each one of the valves including,
(a) a body housing having,
a pair of flanges parallel to each other and facing in opposite directions, whereby the body housing may be joined to the body housings of the other valves of the series by coupling to their flanges,
a partition in the housing arranged to extend between the opposed flanges to form two parallel passages between the flanges and opening at opposite ends of the housing, a first of the parallel passages being connected to the first outlet conduit and the second of the parallel passages connected to the second outlet conduit,
and a closed chamber in the partition,
(b) an inlet connection into the chamber from a point external the housing and communicating with one of the inlet conduits from a well through which the production is introduced into the closed chamber formed within the hollow partition,
(c) a first bonnet mounted on the housing,
(d) a valve operator mounted on the first bonnet and extending from external of the housing through an access opening through the housing wall and through one of two opposed ports of the chamber in the partition, each of which ports provides communication between the chamber and one of the parallel passages,
(e) valve seats in the opposed ports of the chamber in the partition, the seats sized and arranged to be removable through one of the ports and the access opening through the housing wall for the valve operator mounted on the first bonnet,
(f) a first valve element mounted on the valve operator mounted on the first bonnet and reciprocated within the partition chamber to alternately engage the valve seats, the first valve element being removable through the access opening,
(g) a second bonnet mounted on the housing,
(h) a second valve element arranged to engage the partition about one of the chamber ports on the side of the port which is away from the associated seat and thereby isolate the inlet connection and inlet conduit from a well and one of the parallel passages and the outlet conduit connected to the one parallel passage from the other parallel passage while the first valve element and both removable seats are taken through the access opening through the housing wall for repair and replacement,
(i) a valve operator mounted on the second bonnet and extending from external the housing to position the second valve element,
(j) and a shut-off valve in each inlet conduit from each well, whereby when a selected one of the shut-off valves is closed and the second valve element of the valve connected to the conduits is seated on its port the first valve element may be removed from the body housing for inspection and repair and replacement while the remaining valves of the series connected to the several inlet conduits function to convey their production through the other of the parallel passages.

8. A conduit system for manifolding the production of a series of wells including;
an inlet conduit from each well for conveying production;
a first outlet conduit into which the production of the inlet conduits is placed for conveyance to a common point;
a second outlet conduit to which the inlet conduits are selectively connected for conveying the production of the inlets selected to test apparatus;
and a series of valves connected to the conduits and each one of the valves including,
(a) a body housing having,
a pair of flanges parallel to each other and facing in opposite directions, whereby the body housing may be joined to the body housings of the other valves of the series by coupling to their flanges,
a partition in the housing arranged to extend between the opposed flanges to form two parallel passages between the flanges and opening at opposite ends of the housing, a first of the parallel passages being connected to the first outlet conduit and the second of the parallel passages connected to the second outlet conduit,
and a closed chamber in the partition,
(b) an inlet connection into the chamber from a point external the housing and communicating with one of the inlet conduits from a well through which the production is introduced into the closed chamber formed within the hollow partition,
(c) a first bonnet mounted on the housing, (d) a valve operator mounted on the first bonnet and extending from external of the housing through an access opening through the housing wall and through one of two opposed ports of the chamber in the partition, each of which ports provides communication between the chamber and one of the parallel passages, (e) valve seats in the opposed ports of the chamber in the partition, the seats sized and arranged to be removable through one of the ports and the access opening through the housing wall for the valve operator mounted on the first bonnet, (f) a first valve element mounted on the valve operator mounted on the first bonnet and reciprocated within the partition chamber to alternately engage the valve seats, the first valve element being removable through the access opening, (g) a second bonnet mounted on the housing, (h) a second valve element arranged to engage the partition about one of the chamber ports on the side of the port which is away from the associated seat and thereby isolate the inlet connection and inlet conduit from a well and one of the parallel passages and the outlet conduit connected to the one parallel passage from the other parallel passage while the first valve element and both removable seats are taken through the access opening through the housing wall for repair and replacement, (i) a valve operator mounted on the second bonnet and extending from external the housing to position the second valve element, (j) means for actuating the operator on the second bonnet by a fluid pressure which is generated when it is desirable to gain access to the first valve element and its valve seats in the body housing for repair and replacement, (k) and a shut-off valve in each inlet conduit from each well, whereby when a selected one of the shut-off valves is closed and the second valve element of the valve connected to the conduits is seated on its port the first valve element may be removed from the body housing for inspection and repair and replacement while the remaining valves of the series connected to the several inlet conduits function to convey their production through the other of the parallel passages.

References Cited in the file of this patent

UNITED STATES PATENTS

| | | |
|---|---|---|
| 787,627 | Lippold | Apr. 18, 1905 |
| 966,797 | Conrader | Aug. 9, 1910 |
| 1,768,212 | Reedy | June 24, 1930 |

FOREIGN PATENTS

| | | |
|---|---|---|
| 2,808 | Great Britain | of 1907 |
| 160,546 | Great Britain | of 1921 |
| 341,331 | Italy | of 1936 |
| 826,395 | Germany | of 1952 |